United States Patent [19]

Malacheski

[11] 4,222,171

[45] Sep. 16, 1980

[54] DRAFTING INSTRUMENT

[76] Inventor: Joseph J. Malacheski, 781 S. Main St., Wilkes-Barre, Pa. 18702

[21] Appl. No.: 71,783

[22] Filed: Aug. 31, 1979

[51] Int. Cl.³ .............................................. B43L 9/00
[52] U.S. Cl. ...................................................... 33/26
[58] Field of Search ...................... 33/435, 27 R, 27 C, 33/32 R, 32 B, 32 C, 1 N, 1 M, 189; 33/26

[56] References Cited

U.S. PATENT DOCUMENTS

| | | | |
|---|---|---|---|
| 1,266,010 | 5/1918 | Golden | 33/26 |
| 1,927,992 | 9/1933 | Pulver | 33/189 |
| 2,624,117 | 1/1953 | Paci | 33/27 C |
| 3,460,261 | 8/1969 | Frey | 33/27 C |
| 3,548,503 | 12/1970 | Feltenberger | 33/26 |

Primary Examiner—Harry N. Haroian

[57] ABSTRACT

A drafting instrument wherein a plate having a circular through opening concentrically arrayed thereabout with calibrated scales and into which a dish having handles is insertable and rotable therein, the drafting instrument being positioned on one face of a sheet to be worked, the dish having a track upstanding from its floor and extending generally along an axis of the dish, a carriage moveable along the track, a plunger being selectively depressible and carried by the carriage, a graphite rod, held by and depending from the plunger extending through an opening of the track, for working engagement with the worksheet.

8 Claims, 10 Drawing Figures

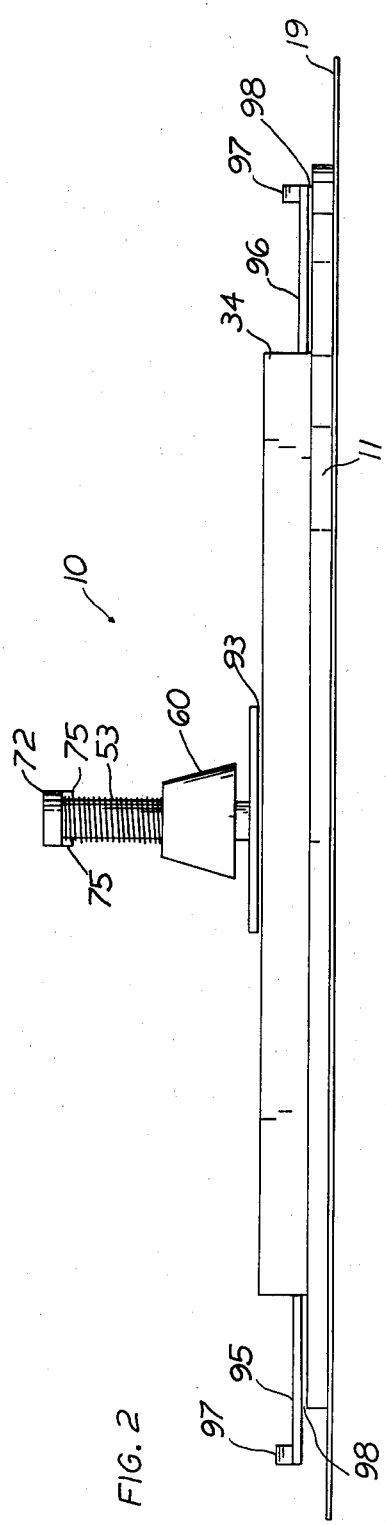
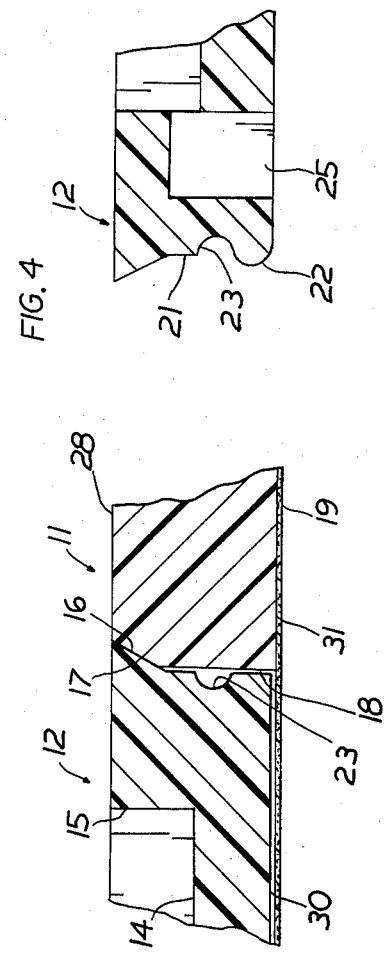
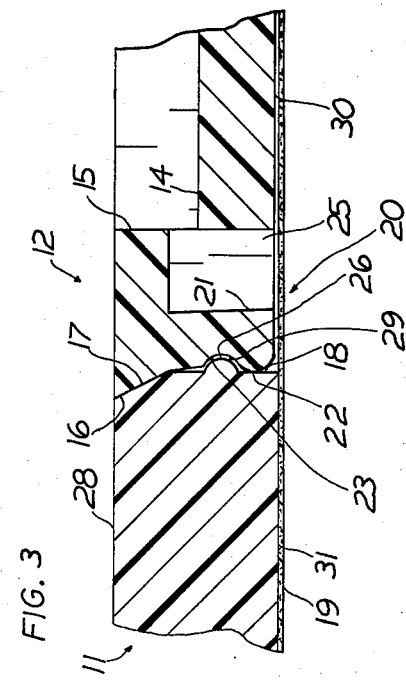
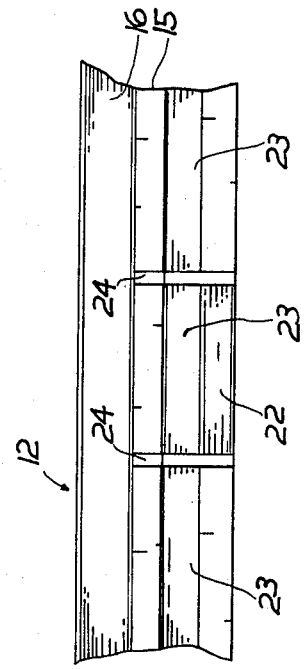
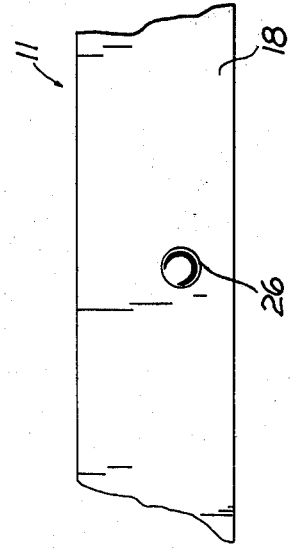

4,222,171

DRAFTING INSTRUMENT

BACKGROUND OF THE INVENTION

As is well known to those versed in drafting and various like arts, many projects require the procedure of drawing circles and dividing the same into degrees and parts. Heretofore the procedure required substantial time and skill, primarily due to the need for a variety of conventional instruments to do so, such as protractor, compass, dividers, ruler, pencil, template, subjecting the artist to tedium and expense.

SUMMARY OF THE INVENTION

Accordingly, it is an important object of the present invention to provide a drafting instrument for facilely dividing a circle, as well as to find the measure in degrees of a representation of angle and to draw the same and radial and axis lines or the like, to thereby overcome the difficulties of the prior art mentioned above by virtually eliminating the need for a multiplicity of instruments, as mentioned above.

It is a further object of the present invention to provide a facile manner of making relatively large and small circles and arcs, especially concentric ones.

It is also a further object of the present invention to eliminate the need for sharpening a drawing lead, by employing a fine lead.

It is still a further object of the present invention to eliminate the need for a compass pivotal needle, so that worksheet will not be damaged.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 2 is an elevational view of the drafting instrument of FIG. 1.

FIG. 3 is a partial sectional elevational view broken to conserve drawing space and on an enlarged scale taken generally along the line 3—3 of FIG. 1.

FIG. 4 is a partial sectional elevational view on an enlarged scale taken generally along the line 4—4 of FIG. 1.

FIG. 5 is a partial elevational view on an enlarged scale of the part of the connection means on the plate taken generally along the line 5—5 of FIG. 1.

FIG. 6 is a partial elevational view on an enlarged scale of the part of the connection means on the dish taken generally along the line 6—6 of FIG. 1.

DESCRIPTION OF THE PREFERRED EMBODIMENT

Figure 1:
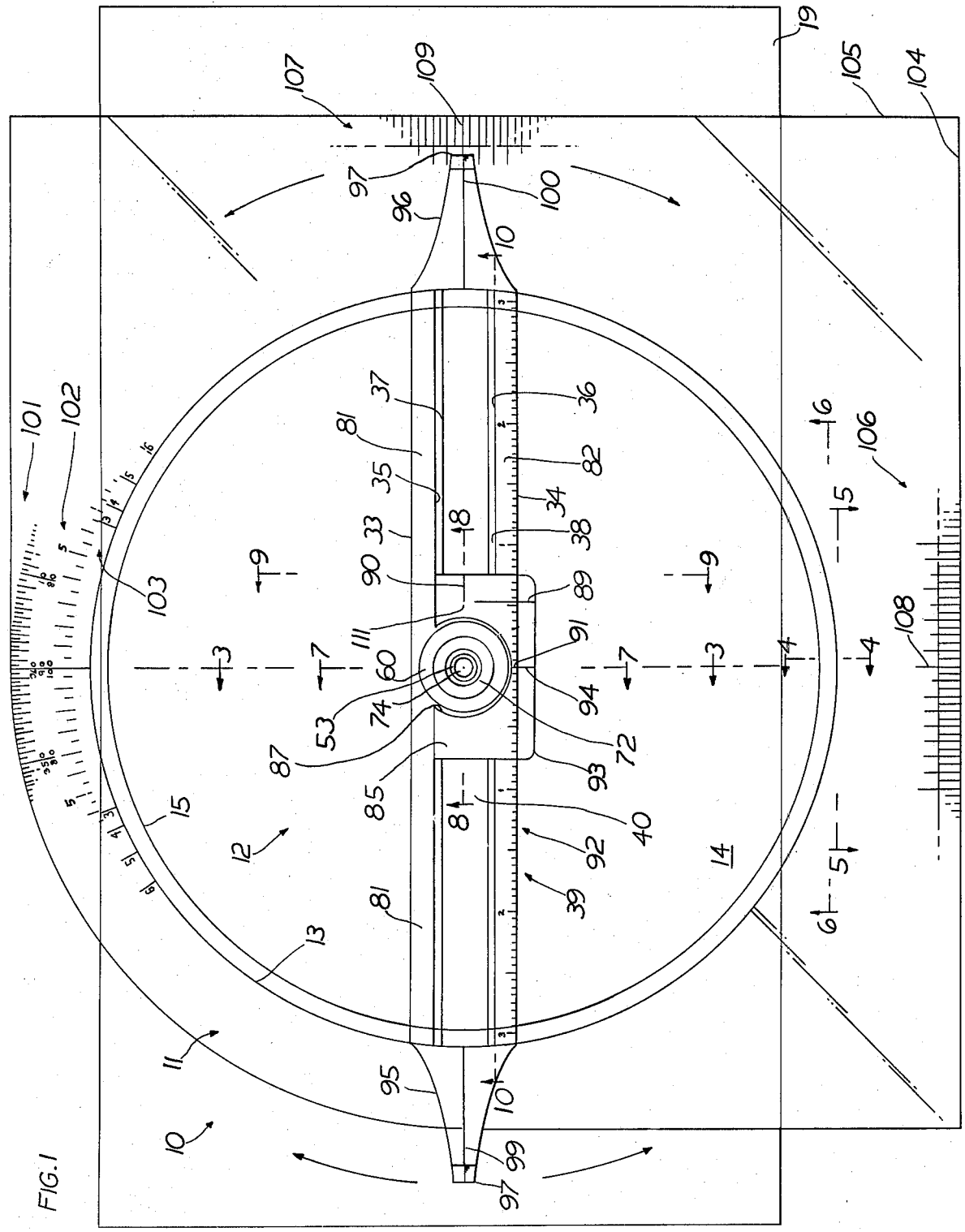
FIG. 1 is a top plan view showing a drafting instrument in accordance with the teaching of the present invention.

Referring now more particularly to the drawings and specifically FIG. 1 thereof, a drafting instrument is there generally designated 10, of transparent material, including a plate 11 and a dish, generally designated 12.

More particularly, plate 11 may have a circular through opening 13, into which dish 12 is insertable for rotable movement therein. Said dish may have a floor 14 and a wall 15 upstanding along its periphery.

Referring now to FIG. 3, there is illustrated wall 15, the outside thereof spaced from the wall 18 of said circular through opening, which has a countersink 17 into which seats the frustoconical flange 16, which is outward from wall 15.

Dish 12 may connect with plate 11 by a connection means, generally designated 20, as in FIG. 3, showing said plate and said dish in a connective state, FIGS. 5 and 6 showing said connection means in a nonconnective state. Said connection means, of which there may be more than one and equally spaced, is comprised of a nub 26, of hemispherical configuration and outward from wall 18, a member 21, being deflectable and having a bead 22 and a groove 23, which circuits the outside of wall 15, member 21 being defined by parallel vertical slots 24 through wall 15 and being less than the thickness thereof to thereby leave a space, as at 25, into which to deflect when cam actuated by nub 26.

Accordingly, by aligning member 21 with nub 26 and then pressing dish 12 into circular through opening 13, bead 22 will contact nub 26 which will thus deflect member 21, which resiliently reverts to an undeflected condition when bead 22 has ridden down over nub 26 and the frustoconical flange 16 has seated in countersink 17, as seen in FIG. 3.

Also seen in FIG. 3 is the nub 26 spaced from groove 23 so as not to contiguously disturb dish 12 when in rotable motion. However, if said dish tends to move from circular through opening 13, as when the drafting instrument 10 is being transported, groove 23 will then contact nub 26 to preclude disconnection of dish 12 from plate 11.

It will be appreciated that the space, as at 29, between the wall 15 and the wall 18 indicates that precision molding is not required of the circular through opening 13 and the outside diameter of the dish 12, which may be slightly smaller than the diameter of the former. FIG. 4 shows bead 22 projects slightly beyond the face of member 21 so as to resiliently register against wall 18. Thus, three or more said connection means will snugly position the dish 12 to be centrally balanced in circular through opening 13, as well as to prevent said dish from moving vagrantly therein and off measurements taken, as will appear presently.

As best seen in FIG. 3, the bottom 30 of floor 14 is slightly above the base 31 of plate 11, said bottom, therefore, being slightly above the worksheet 19 to not mar or frictionize the same.

As best seen in FIGS. 1 and 2, integral with dish 12 and upstanding from the floor 14 thereof, is a track, generally designated 39, including walls 33, 34 which are parallel and equidistant from and on opposite sides of a planar axis of dish 14 and each having an inner vertical side 35, 36 meeting an inner angled side 37, 38, respectively, spaced apart by a through slot 40, for a purpose as will appear presently.

Figures 7, 8:
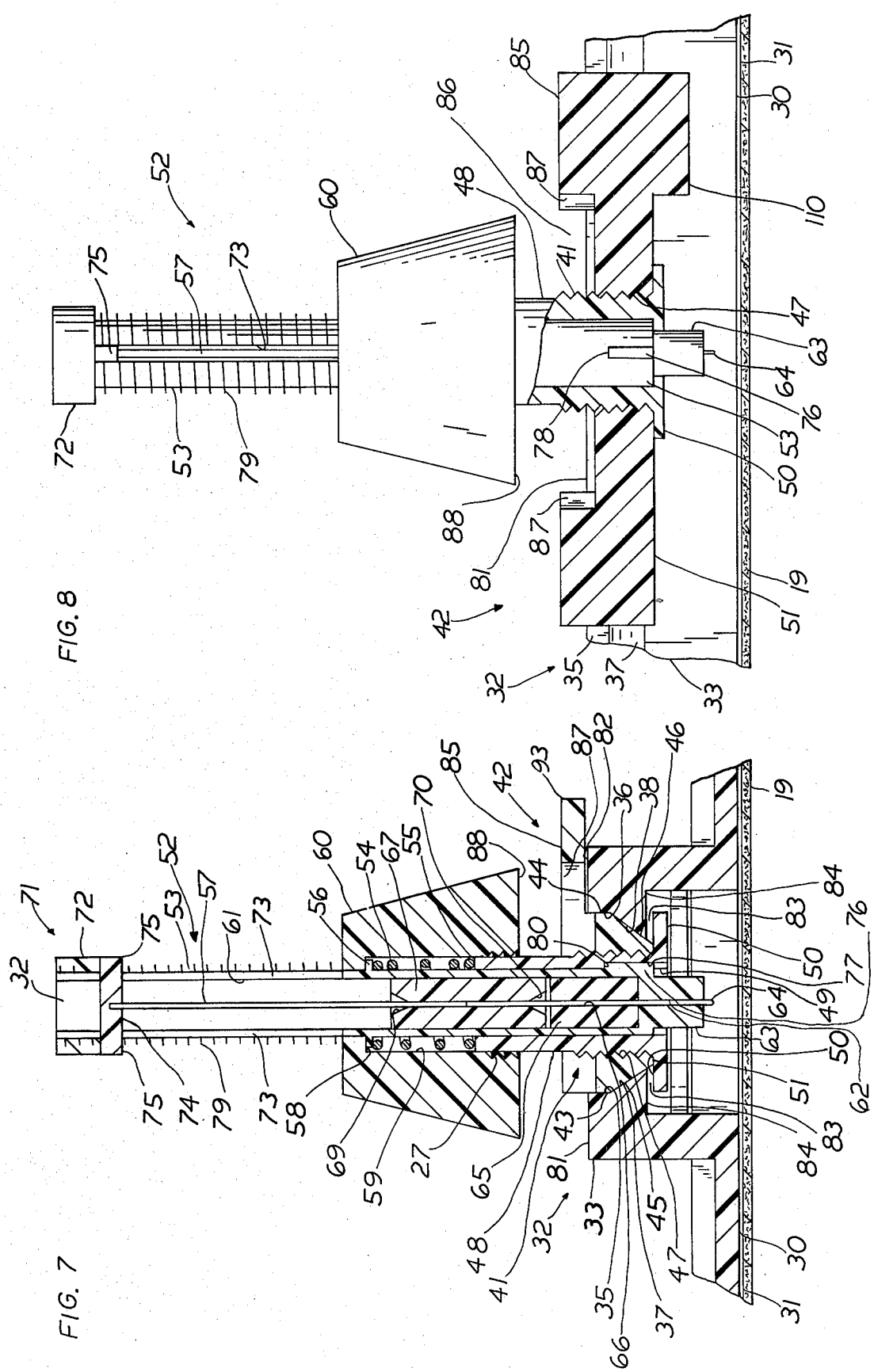
FIG. 7 is a partial sectional elevational view on an enlarged scale showing the plunger in an undepressed condition taken generally along the line 7—7 of FIG. 1.
FIG. 8 is a partial sectional elevational on an enlarged scale showing the plunger in an undepressed condition taken generally along the line 8—8 of FIG. 1.
Figure 9:
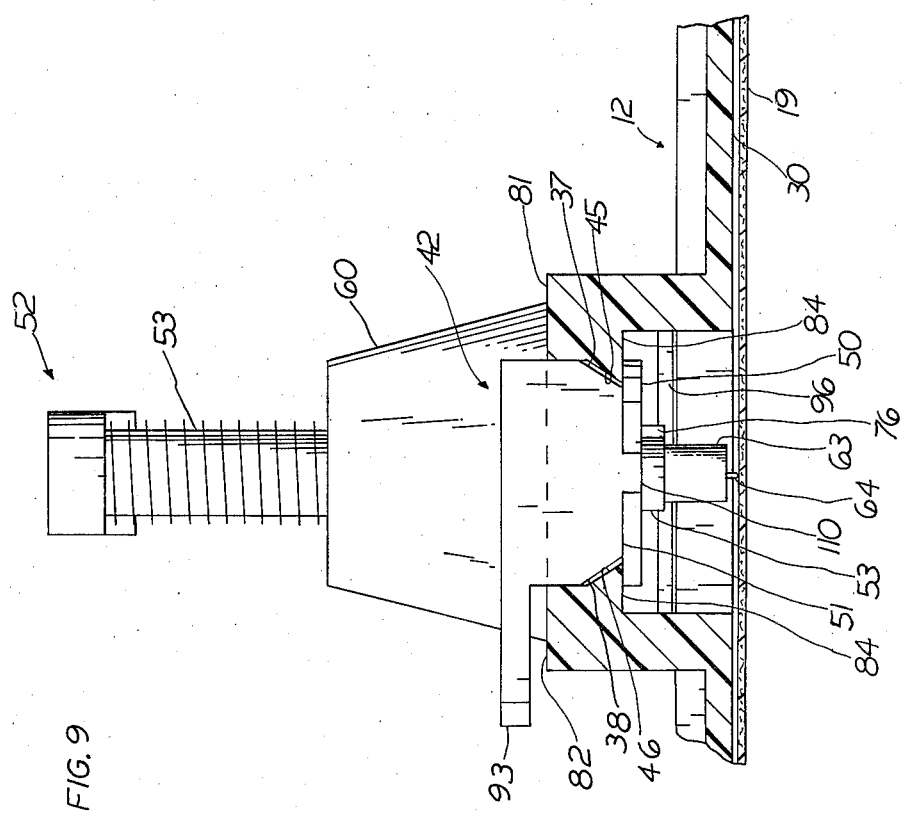
FIG. 9 is a partial sectional elevational view on an enlarged scale showing the carriage in a locked condition and the plunger held in a fixed depressed condition taken generally along the line 9—9 of FIG. 1.

As illustrated in FIGS. 7 and 9, configured to conformably occupy the track 39 and to, therefore, be slidably moveable therealong, is a carriage, generally designated 42, having vertical sides 43, 44 that register against inner vertical sides 35, 36, respectively, and having angled bottom sides 45, 46 that register against inner angled sides 37, 38, respectively, which, sloping toward each other, accordingly define a wedge-shaped base or valley that stabilizes said carriage during its lateral movement and prevents the same from binding in said track, that is, vertical sides 43, 44 are prevented from binding against inner vertical sides 35, 36, respectively.

As shown in FIGS. 7 to 10, carriage 42 has a threaded through opening 47 to engage a threaded insert, generally designated 48, having a through opening 49 and a limit member or annular flange 50 for limiting abutment against the bottom 51 of said carriage, and extending under ceilings 84 for a purpose as will appear presently. Insertable in through opening 49 and held upright therein, is a plunger, generally designated 52, which passes through a compression spring 54, which is supported by the rim 55 of said threaded insert and which resiliently urges against the bottom of an annular ledge 56, outward from the plunger tube 53, to hold the same in an undepressed condition at a fixed height limited by the abutment of the top of said annular ledge against the ceiling 58 of the cylindrical hollow 59 in knob 60, said knob being constrained to up and down movement on the portion of the threaded insert 48 projecting out of the carriage 42, said cylindrical hollow being partially threaded, as at 27, to engage the exposed threads 41 of said threaded insert for a purpose as will appear presently.

Within plunger tube 53 is a cylindrical well 61 having a top opening 32 and having, central of its base, a through opening 62, which passes through the plunger barrel 63 at the bottom of said plunger tube, a graphite rod 64 being in through opening 62 and projecting from said plunger barrel to be in position to address the worksheet 19, as the plunger tube 53 extends through the through slot 40. A rubber plug 65 is snugly insertable into cylindrical well 61 to the base thereof, and has a through opening 66 having a diameter slightly smaller than that of graphite rod 64 to compressively hold the same from falling from plunger barrel 63. Also snugly insertable in cylindrical well 61 is a stub cylinder 67 above rubber plug 65 and having at its top a funnelform cavity 69 for allowing entrance of a push rod 57 into through opening 68 and having at its bottom also a funnelform cavity 70 for allowing entrance of graphite rod 64 into through opening 68, the said plunger being loaded with graphite rod 64 through barrel 63, said push rod abutting against graphite rod 64 in the through opening 68 for a purpose as will appear presently.

A lead adjustment means, generally designated 71, comprising a band 72, threadedly inwardly, to engage screwthreads 79 on plunger tube 53, having two vertical through slots 73, starting at the top of said plunger tube and extending to approximately midpoint thereof and spaced 180° thereon, there being within cylindrical well 61 a disk 74 having two wings 75 projecting from its periphery and spaced 180° thereon to ride within and project from vertical through slots 73 to constrain said disk to up and down movement within said cylindrical well. Thus, band 72, when screwed downwardly on plunger tube 53, will, being contiguous with wings 75, drive downwardly disk 74 which, holding push rod 57 in alignment with graphite rod 64, will feed said graphite rod out of the plunger barrel 63, when required.

A key 76 on plunger tube 53, at the lower end thereof within the through opening 49, enters a keyway 77 in said threaded insert to prevent plunger tube 53 from turning when band 72 is being screwed up or down thereon, as well as to prevent said plunger tube from coming out of through opening 49 and to keep it at a fixed height in an undepressed condition limited by the end wall 78 of said key abutting against the roof 80 of said keyway.

Figure 10:
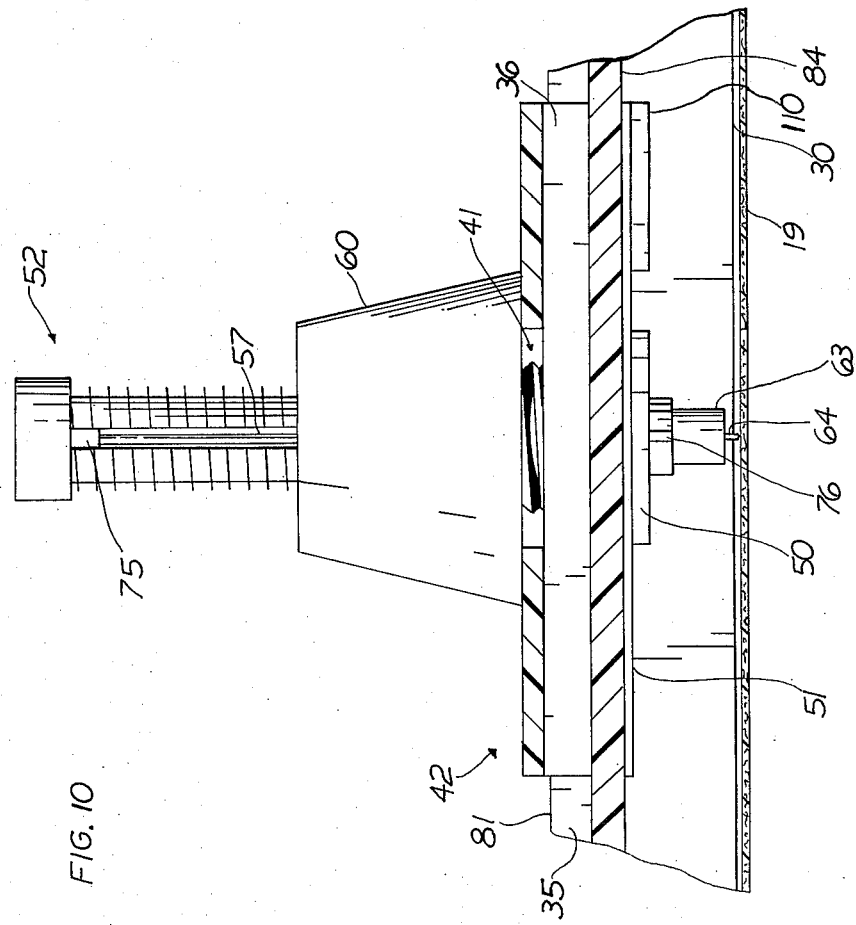
FIG. 10 is a partial sectional elevational view on an enlarged scale showing the plunger in a depressed condition taken generally along the line 10—10 of FIG. 1.

Carriage 42 may be moved along track 39 a selected distance while at the same time the plunger 52 may be selectively depressed to bring graphite rod 64 in contact with said worksheet by pushing downwardly knob 60, which when released cause said plunger to return to an undepressed condition at a fixed height, as shown in FIGS. 7 and 8, FIG. 10 showing the said plunger in a depressed condition.

As seen in FIGS. 7 and 9, the carriage 42 is laterally retained on track 39 and its lateral range of movement limited thereon by the plunger barrel 63, which, projecting into a plane generally midpoint of the wall 15, will thus contact said wall when said carriage is moved to either end of track 39.

When it is desired to use the drafting instrument 10 as a compass to draw circles or arcs, the carriage 42 is locked along the track 39 a selected distance relative to a specifically sized circle or arc, as can be conveniently measured with the calibrated scale 92, which will appear more fully hereinafter, by screwing knob 60 downward on threaded insert 48 so that the bottom 88 of said knob comes to bear against the tops 81, 82 of walls 33, 34, respectively, to thereby lift said carriage until annular flange 50, taking up the space, as at 83, comes into limiting abutment with the ceilings 84, defined by inner angled sides 37, 38, to lock said carriage as well as to prevent the same from being vertically removed from track 39, as seen in FIG. 9.

So that said bottom of knob 60 may come to bear against said tops of walls 33, 34, respectively, when said carriage is being lifted up when being locked in position on the track 39, there is an opening 86 in the top 85 of said carriage into which knob 60 may enter, said opening having arcuate walls 87, as illustrated in FIGS. 8 and 10, and also in FIGS. 1, 7, and 9.

Thus, when carriage 42 is in a locked condition, either of handles 95, 96, as seen in FIGS. 1 and 2, may be manipulated to turn dish 12 in either a clockwise or counterclockwise direction, as desired, each said handle having an upstanding triangular nib 97 for increased or slight manipulation of said handle, said handles being slightly above the plate surface 28 to thereby leave anti-friction spaces, as at 98, so that said handles will not frictionize against said plate surface, as shown in FIG. 2.

As seen in FIG. 1, imprinted on said top of carriage 42 is an index line 89 and imprinted on the bottom of said carriage on an extension 110 is an index line 90 at right angles to line 89, said lines being for determining the center point of dish 12, for a purpose as will appear presently. More specifically, when line 89 is aligned over the center line 91 of the calibrated scale of 92 imprinted on said top of wall 34, line 89 is accordingly on a plane containing the center point of dish 12, as the center line 91 is likewise on a plane containing the center point of dish 12. Moreover, line 90 is also on a plane containing the center point of dish 12, the end 111 of said line thus being at the center point of said dish when carriage 42 is positioned on the track 39 so that line 89 is aligned over the center line 91. Thus, the end 111, at such time, can be visually set directly over any dot, point, or reference mark made on the worksheet 19 to be regarded as a center point of a circle or other configuration existing on the said worksheet or to be drawn or imagined thereon, so that the center point of the dish 12 will thus be coincident with the reference mark. Extension 110 permits the line 90 to be as close to said worksheet as possible, so that the end 111 may be accurately aligned over a reference mark.

As seen in FIG. 1, 7, and 9, projecting laterally from said top of carriage 42, is a ledge 93, which extends over and beyond said top of wall 34 and having an index line 94 imprinted thereon on a plane containing the center point of graphic rod 64. Thus, when index line 94 is aligned with any measurement line of the calibrated scale 92, the same will, accordingly, identify the distance to the right or left of the center line 91, as the case may be and, thus, one-half the diameter of a circle or the full length of a line to be drawn, as the case may be, with said drafting instrument. And, thus, when the index line 89 is aligned with the center line 91, said drafting instrument will be in a condition to draw an axis line respective of dish 12.

As shown in FIG. 1, imprinted on each handle 95, 96 is an index line 99, 100, respectively, being on a plane containing the center point of graphite rod 64. Thus, by rotating dish 12, either index line 99, 100 may be aligned with any graduation line of any calibrated scale 101–103, arrayed concentrically on the plate surface 28 about the circular through opening 13, such as the calibrated scale 101 of 360°, the calibrated scale 102 of 100 points, and the calibrated scale 103, dividing a circle into specific parts, each line thereof being numerically to identify the specific part. Calibrated scale 101 may additionally have each quadrant thereof divided into ninety degrees to find the measure in degrees of a representation of angle. Thus, plate 11 may have two straight sides 104, 105, either of which can register against a T square so that the 0° or 90° measurement line of the calibrated scale 101 can be positioned in the conventional north position or at twelve-o'clock position, or other measurements lines of the calibrated scale 101 can be positioned as use dictates. Moreover, each straight side 104, 105 may therealong have calibrated scales 106, 107, respectively for taking rectangular coordinate points, lines 108, 109 being the coordinates of origin and being at right angles to each other and each containing the center point of dish 12.

From the foregoing, it is seen that the present invention provides a drafting instrument that effectively provides a rotating axis that can be selectively set relative to various calibrated scales, and lines relative thereto drawn on the worksheet without employing extraneous drafting tools and procedures, such as aligning points or degrees of measurement with the center point of a circle or changing the position of the instrument, which, accordingly, enhances the art, is durable, and accurate, and not subject to wear, and can be economically produced, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. In a drafting instrument, the combination comprising a plate for positioning on one face of a worksheet and having a circular through opening having a countersink and having calibrated scales concentrically arrayed thereabout, a dish insertable in said circular through opening and rotable therein and having upstanding along its periphery a circular wall having a frustoconical flange, said plate and said dish having a connection means mutually interfitting for connectively combining said plate and said dish, the bottom of said dish being slightly above the bottom of said plate and thus being above said worksheet, a track having a handle at each end and comprising two parallel walls integral with and upstanding from the floor of said dish, a carriage for selective slidable movement along said track and having a locking means for selectively positioning said carriage along said track, a depressible plunger having a resilient means comprising a coil compression spring and carried by said carriage and extending through a through slot of said track, a drawing lead held by said depressible plunger and depending therefrom for selective drawing engagement with said worksheet, wherein the improvement comprises said connection means comprising a semicircular groove circuiting said circular wall and at least two equally spaced resilient members defined by through slots in said wall of said dish and each having a semicircular groove and a bead and comprising at least two equally spaced nubs on said wall of said circular through opening, said track and said through slot thereof traversing the diameter of said dish to allow said carriage a range of movement for said drawing lead to draw a straight line from one point on the perimeter of said dish to an opposite point on the perimeter of said dish, said track having a handle at each end for the manipulative rotation of said dish, said carriage having angled bottom sides for receptive conformability into said track having a valley of generally V-shaped cross-sectional outline defined by inner angled sides against which said angled bottom sides receptively conform for a positive seating of said carriage to ensure a positively smooth slidable movement of said carriage therein and to prevent said carriage of any vagrant movement therein regardless of any degree of wear experienced by said angled bottom sides and said valley, said carriage having a locking means for selectively positioning said carriage along said track while at the same time depressing said depressible plunger to bring said drawing lead into bearing engagement with said worksheet, said carriage having a centering means comprising two index lines at right angles for positioning center of said dish on a reference point of said worksheet, said depressible plunger having a feeding means for said drawing lead.

2. The combination according to claim 1, said equally spaced nubs for deflecting said resilient members during insertion of said dish into said circular through opening and for entering into said semicircular grooves for maintaining connection of said dish and said plate.

3. The combination according to claim 2, said each bead projecting from face of said each resilient member urging its said bead against said wall of said circular through opening to prevent said dish from experiencing vagrant motion and to balance the same centrally in said circular through opening.

4. The combination according to claim 1, said handles being slightly above the surface of said plate and extending over said calibrated scales therearound and each having an index line for superimposed alignment with measurement lines of said calibrated scales.

5. The combination according to claim 1, said locking means comprising a knob having a cylindrical hollow partially threaded having a ceiling having an aperture through which upstands said depressible plunger having an outer annular flange on which said ceiling rests to mount said knob on said depressible plunger, a threaded insert central of and upstanding from said carriage and enterable into said cylindrical hollow when said knob is depressed to threadedly engage said insert to lock said carriage along said track and depress said depressible plunger.

6. The combination according to claim 1, said feeding means comprising a band threadedly engageable around said depressible plunger and bearing against wings of a disk that project from vertical through slots of said depressible plunger, said disk being within said depressible plunger and holding a push rod bearing against said drawing lead for feeding out of said depressible plunger when said band is turned downwardly thereon, said push rod and said drawing lead held central of said depressible plunger by a stub cylinder within said depressible plunger, said drawing lead held snugly in position and retained in said depressible plunger by a rubber plug within said depressible plunger at the bottom thereof.

7. The combination according to claim 1, said one index line being at right angles to said track and superimposable over a measurement line central of a calibrated scale along said track, said measurement line being on a plane coincident with the center of said dish, said other index line being parallel with said track and on a plane coincident with the center of said dish and said drawing lead and such that an end thereof is coincident with the center point of said dish when viewed from above and to be coincident with a reference point of said worksheet by positioning said drafting instrument.

8. The combination according to claim 3, said spaced resilient members and said spaced nubs being in circumferential alignment.

* * * * *